United States Patent
McDonnell et al.

(10) Patent No.: US 8,793,057 B2
(45) Date of Patent: Jul. 29, 2014

(54) BOUNDED VEHICLE DRIVELINE TWIST ESTIMATING

(71) Applicant: Ford Global Technologies, LLC, Dearborn, MI (US)

(72) Inventors: Alexander P. McDonnell, Dexter, MI (US); Terry G. Feldpausch, Carleton, MI (US); Bradley D. Riedle, Northville, MI (US); Jeffrey A. Doering, Canton, MI (US); Peter D. Kuechler, Canton, MI (US); John E. Rollinger, Sterling Heights, MI (US); David H. Schmitt, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/709,444

(22) Filed: Dec. 10, 2012

(65) Prior Publication Data

US 2013/0096789 A1    Apr. 18, 2013

Related U.S. Application Data

(63) Continuation-in-part of application No. 12/916,831, filed on Nov. 1, 2010, now Pat. No. 8,332,111.

(51) Int. Cl.

| G06F 7/00 | (2006.01) |
|---|---|
| G06F 17/00 | (2006.01) |
| B60W 10/06 | (2006.01) |
| B60W 10/04 | (2006.01) |
| B60W 10/02 | (2006.01) |
| B60W 30/19 | (2012.01) |
| F16D 48/06 | (2006.01) |
| B60W 10/113 | (2012.01) |

(52) U.S. Cl.

CPC ........ *B60W 10/04* (2013.01); *F16D 2500/1066* (2013.01); *F16D 2500/7044* (2013.01); *B60W 10/06* (2013.01); *B60W 2710/025* (2013.01); *F16D 2500/70426* (2013.01); *B60W 10/02* (2013.01); *B60W 30/19* (2013.01); *B60W 2710/1005* (2013.01); *F16D 48/06* (2013.01); *B60W 2710/0666* (2013.01); *B60W 2710/023* (2013.01); *F16D 2500/50293* (2013.01); *B60W 10/113* (2013.01); *F16D 2500/50623* (2013.01); *F16D 2500/1086* (2013.01)

USPC .............................................. 701/54; 701/68

(58) Field of Classification Search

USPC .................. 701/54, 68; 477/34, 39–40, 70, 77
See application file for complete search history.

(56) References Cited

U.S. PATENT DOCUMENTS

| 6,646,412 B2 | 11/2003 | Wu et al. |
|---|---|---|
| 6,991,585 B2 | 1/2006 | Colvin et al. |

(Continued)

*Primary Examiner* — Yonel Beaulieu
(74) *Attorney, Agent, or Firm* — James Dottavio; MacMillan, Sobanski & Todd, LLC (57) ABSTRACT

A method for controlling a vehicle driveline having a power source and a transmission clutch includes using a difference between two spaced locations in the subject vehicle driveline to determine driveline twist speed due to applied torque, using a product of driveline twist speed and a sampling interval to produce an estimated driveline twist from the sum of incremental changes in driveline twist that are between predetermined upper and lower magnitudes, producing, in response to a demanded wheel torque, a first signal that controls torque transmitted from the power source to the clutch during a lash crossing using the estimated driveline twist and the current driveline torque; and producing a second signal that controls clutch torque capacity such that clutch slip is produced during the lash crossing.

14 Claims, 8 Drawing Sheets

(56) References Cited

U.S. PATENT DOCUMENTS

| | | |
|---|---|---|
| 7,223,203 B2 | 5/2007 | Yamazaki et al. |
| 7,971,667 B2 | 7/2011 | Yamazaki |
| 8,192,328 B2 | 6/2012 | Nedorezov et al. |
| 8,219,303 B2 | 7/2012 | Schwenke et al. |
| 8,285,432 B2 | 10/2012 | Heap et al. |
| 8,332,111 B2 * | 12/2012 | McDonnell et al. ............ 701/68 |
| 8,550,961 B2 * | 10/2013 | Jiang et al. ..................... 477/175 |
| 8,594,901 B1 * | 11/2013 | Yoon et al. ...................... 701/90 |
| 2007/0213909 A1 * | 9/2007 | Doering et al. ................. 701/54 |
| 2007/0213910 A1 * | 9/2007 | Doering et al. ................. 701/54 |
| 2012/0109477 A1 | 5/2012 | McDonnell et al. |

\* cited by examiner

BOUNDED VEHICLE DRIVELINE TWIST ESTIMATING

This is a continuation-in-part application of U.S. Pat. No. 8,332,111, issued on Dec. 11, 2012, the entire disclosure of which is incorporated herein by reference.

BACKGROUND OF THE INVENTION

Field of the Invention

This invention relates generally to control of a motor vehicle driveline, particularly to control during a tip-in of a driveline that includes a dual clutch automatic transmission.

During normal operation of a dual-clutch automatic transmission the driven input is connected to the transmission output shaft through gears. When the undriven input is preselected in a gear position in preparation for an anticipated gear ratio change, it is possible for driveline oscillations to cause an audible click-clack sound, during tip-in events. That sound is the result of oscillations in driveline torque and speed causing speed and torque reversals on the transmission components that are driveably connected to the transmission output but not connected to the engine.

Because the undriven input shaft is connected to the output when the next gear is preselected and before its connection to the engine, the meshing helical, preselected gears produce axial motion within the transmission on the undriven shaft. Because the input clutch corresponding to the preselected gear is not applied under these conditions, the entire shaft is free to move axially. When the amplitude of this motion exceeds the axial lash of the system, an impact occurs resulting in an audible output. The resulting sound is described as click-clack. As the driveline oscillates, the lash is taken up on both sides of the gear train.

In general, for good drivability the desired drive line response will be smooth and free of oscillations. To achieve this end, it is necessary to control the energy imparted into the drive line. Energy that is not converted to vehicle acceleration is dissipated through torsional oscillations until that energy is recovered by the clutch, accelerating the vehicle. The coordination of engine and clutch torques is of critical import when managing drive line energy.

Both conventional and hybrid powertrains have backlash in the driveline. When the driveline input torque transitions from negative to positive or from positive to negative the lash zone is crossed. The lash zone must be crossed quickly and not result in any noise, vibration and harshness (NVH) issues. The main NVH issue during lash crossing is referred to as "Clunk" which is the sound that the driveline can make at the completion of the lash crossing. This sound can be reduced by reducing the speed and the torque of the input to the lash at the completion of lash crossing. During a tip-in, if the torque at the input is increased too soon during the lash transition, a clunk sound can result. If the input torque is increased to late, the system can produce a "double clunk". If the input torque is held low, the time to cross lash zone can be too long.

Several methods can be used to determine when the lash zone has been crossed. According to one method the difference between the wheel speeds and either the transmission input shaft speed or the transmission output shaft speed are monitored and used to determine when the lash zone has been crossed. Because of noise on the speed signals, however, the estimate produced by this method tends to become inaccurate over time. When the input torque is not near zero, the estimate can have large errors due to poor signal-to-noise ratio.

On a conventional powertrain, the total negative driveline torque is limited to that achievable by the engine with the fuel off and additional negative torque from assessory loads such as alternator or A/C compressor. On a hybrid powertrain, in which a crankshaft integrated starter generator (CISG) is used, the negative driveline torque can be very large during regenerative braking.

SUMMARY OF THE INVENTION

A method for controlling a vehicle driveline having a power source and a transmission clutch includes using a difference between two spaced locations in the subject vehicle driveline to determine driveline twist speed due to applied torque, using a product of driveline twist speed and a sampling interval to produce an estimated driveline twist from the sum of incremental changes in driveline twist that are between predetermined upper and lower magnitudes, producing, in response to a demanded wheel torque, a first signal that controls torque transmitted from the power source to the clutch during a lash crossing using the estimated driveline twist and the current driveline torque; and producing a second signal that controls clutch torque capacity such that clutch slip is produced during the lash crossing.

The method provides a continuous estimate of driveline twist by using either axle torque estimate directly or, where appropriate, an estimate based on differences between transmission and wheel speeds. Additionally upper and lower bounds are used to limit errors in the estimate.

The method of estimating of driveline twist permits engine torque to be controlled such that both a faster and smoother transition of driveline lash occurs. In a vehicle with a CISG this transition through lash is needed before the vehicle can perform regenerative braking. More regenerative braking leads to better fuel economy. When transitioning from regenerative braking to positive power, a faster lash crossing leads to less vehicle hesitation.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
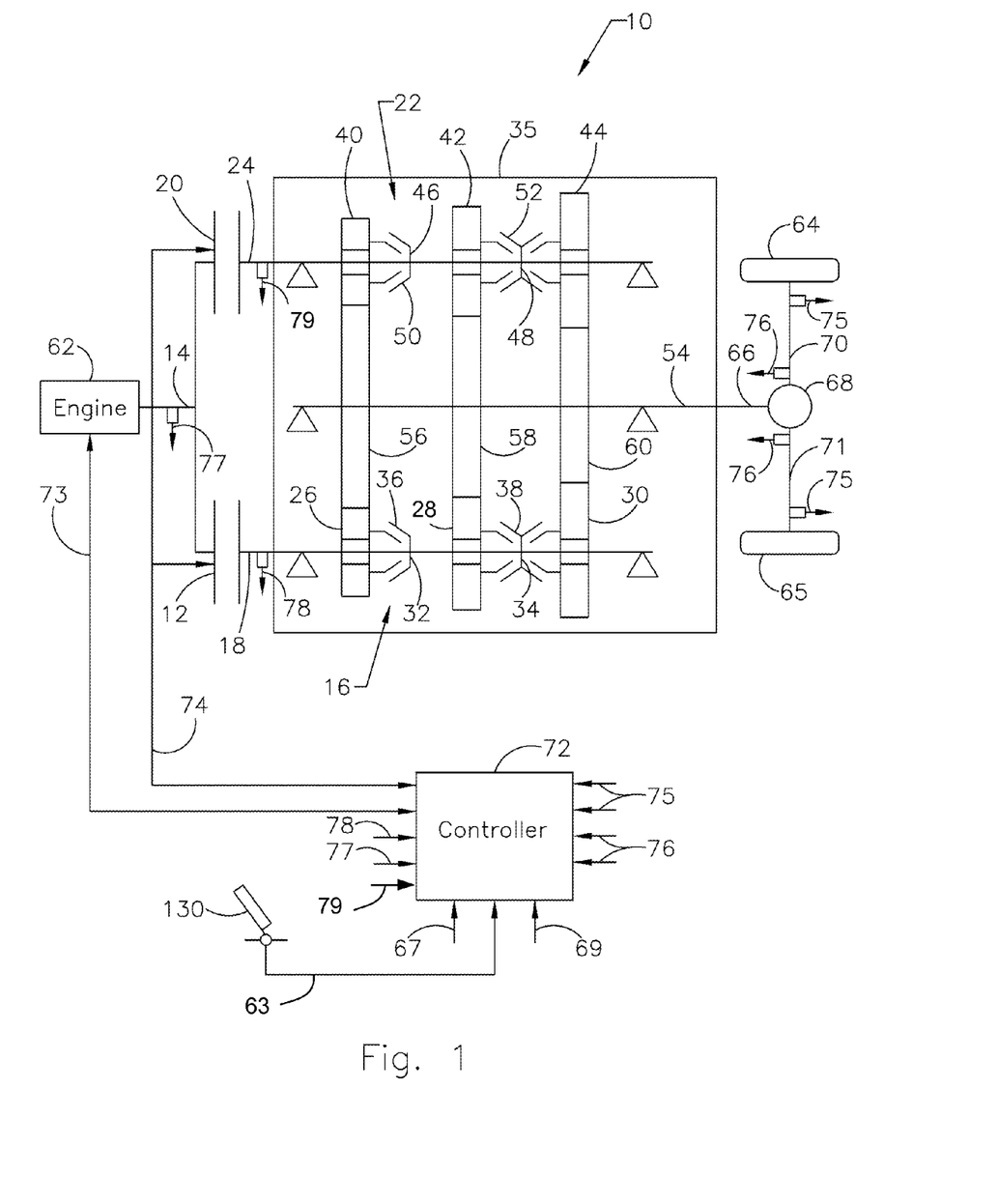
FIG. 1 is a schematic diagram showing details of vehicle driveline that includes a dual clutch powershift automatic transmission and a system for controlling the driveline components.

FIG. 1 illustrates details of a powershift transmission 10 that includes the first input clutch 12, which selective connects the input 14 of the transmission alternately to the even-numbered gears 16 associated with a first layshaft 18, and a second input clutch 20, which selective connects the input 14 alternately to the odd-odd-numbered gears 22 associated with a second layshaft 24. A power source, such as an engine, is continuously driveably connected to the input 14. The road wheels of the vehicle are continuously driveably connected to the output 54 through a driveline, which may include final drive gearing, a driveshaft, a differential mechanism and laterally directed axle shafts, each axle shaft extending from the differential to one of the road wheels.

Layshaft 18 supports pinions 26, 28, 30, which are each journalled on shaft 18, and couplers 32, 34, which are secured to shaft 18. Pinions 26, 28, 30 are associated respectively with the second, fourth and sixth gears. Coupler 32 includes a sleeve 36, which can be moved leftward to engage pinion 26 and driveably connect pinion 26 to shaft 18. Coupler 34 includes a sleeve 38, which can be moved leftward to engage pinion 28 and driveably connect pinion 28 to shaft 18 and can be moved rightward to engage pinion 30 and driveably connect pinion 30 to shaft 18.

Layshaft 24 supports pinions 40, 42, 44, which are each journalled on shaft 24, and couplers 46, 48, which are secured to shaft 24. Pinions 40, 42, 44 are associated respectively with the first, third and fifth gears. Coupler 46 includes a sleeve 50, which can be moved leftward to engage pinion 40 and driveably connect pinion 40 to shaft 24. Coupler 48 includes a sleeve 52, which can be moved leftward to engage pinion 42 and driveably connect pinion 42 to shaft 24 and can be moved rightward to engage pinion 44 and driveably connect pinion 44 to shaft 24.

Transmission output 54 supports gears 56, 58, 60, which are each secured to shaft 54. Gear 56 meshes with pinions 26 and 40. Gear 58 meshes with pinions 28 and 42. Gear 60 meshes with pinions 30 and 44.

Couplers 32, 34, 46, 52 may be synchronizers, or dog clutches or a combination of these.

A power source, such as an engine 62, is continuously driveably connected to the input 14. The road wheels 64, 65 of the vehicle are continuously driveably connected to the output 54 through a driveshaft 66. Torque is transmitted transmitted in a positive torque condition from the engine through a differential mechanism 68 and laterally directed halfshafts 70, 71 to the road wheels 64, 65. During negative torque condition torque is transmitted from the wheels 64, 65 to the engine 62.

The engine 62 and transmission 10 are supported by the vehicle chassis on engine mounts, which permit rotation of the engine-transmission assembly in response to torsional changes produced by the engine. Each engine mount includes a negative stop, which limits the rotation the engine-transmission assembly in one rotary direction, and a positive stop, which limits rotation in the opposite rotary direction. When the vehicle is coasting, the engine-transmission assembly rests on the negative stops. When the vehicle operator tips-in the accelerator pedal, the engine-transmission assembly rotates to the positive stop.

Lash is the angular displacement of the engine-transmission assembly about the axis of the engine on the engine mounts. A lash crossing that occurs in response to a tip-in following a coast condition, is angular displacement of the engine-transmission assembly from the negative engine mount stops to the positive engine mount stops.

Reaction torque is the torque transmitted from the twisting halfshafts 70, 71 back through the transmission gears to the engaged clutch 12, 20.

Halfshaft twist is the angular rotation of the halfshafts 70, 71 about a polar axis through the halfshafts that occurs in response to the application of torque applied to one end of the halfshafts and transmitted to their opposite end.

Figure 2:
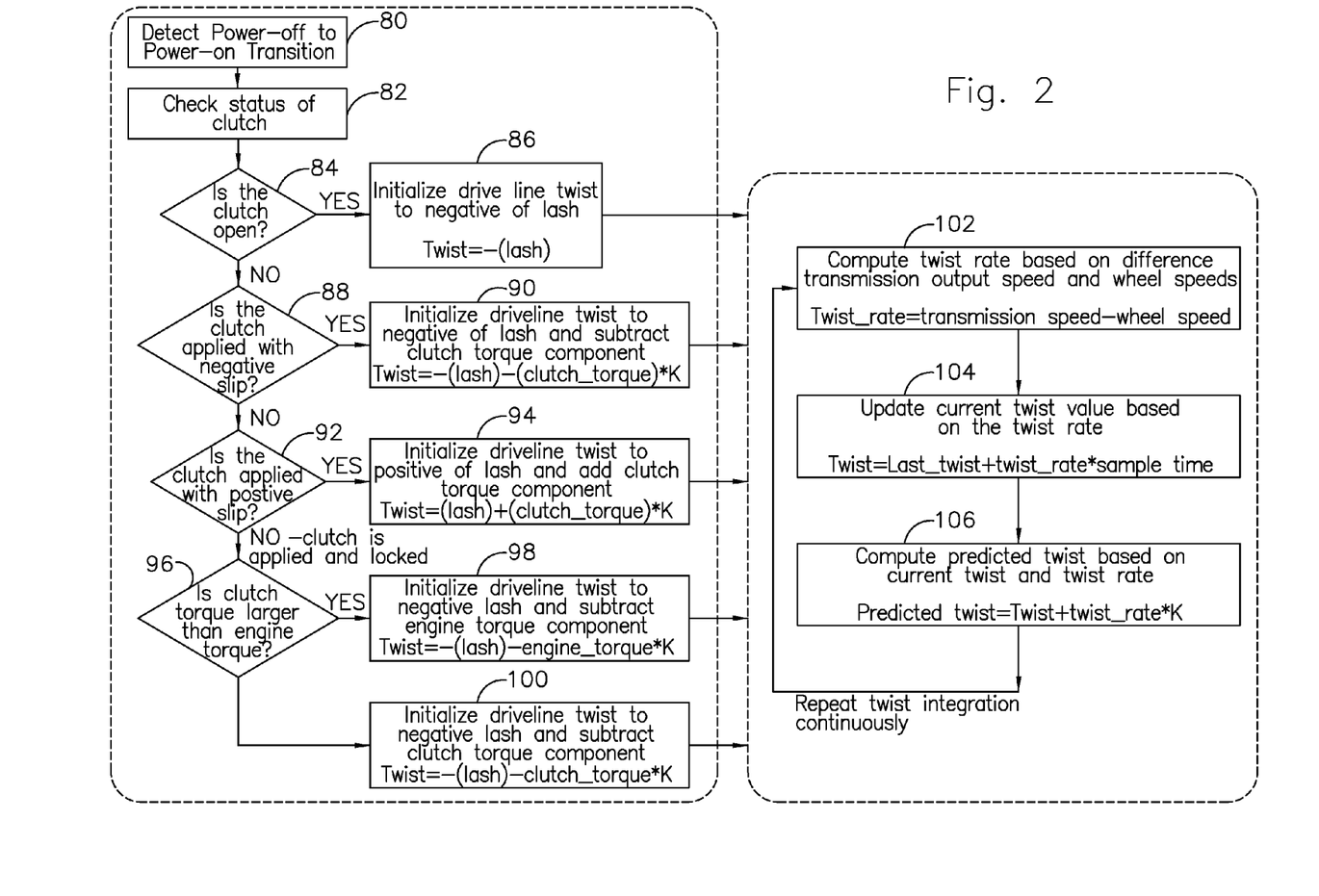
FIG. 2 is logic flow diagram showing the steps of a method for estimating twist in the driveline of FIG. 1.
Figure 3:
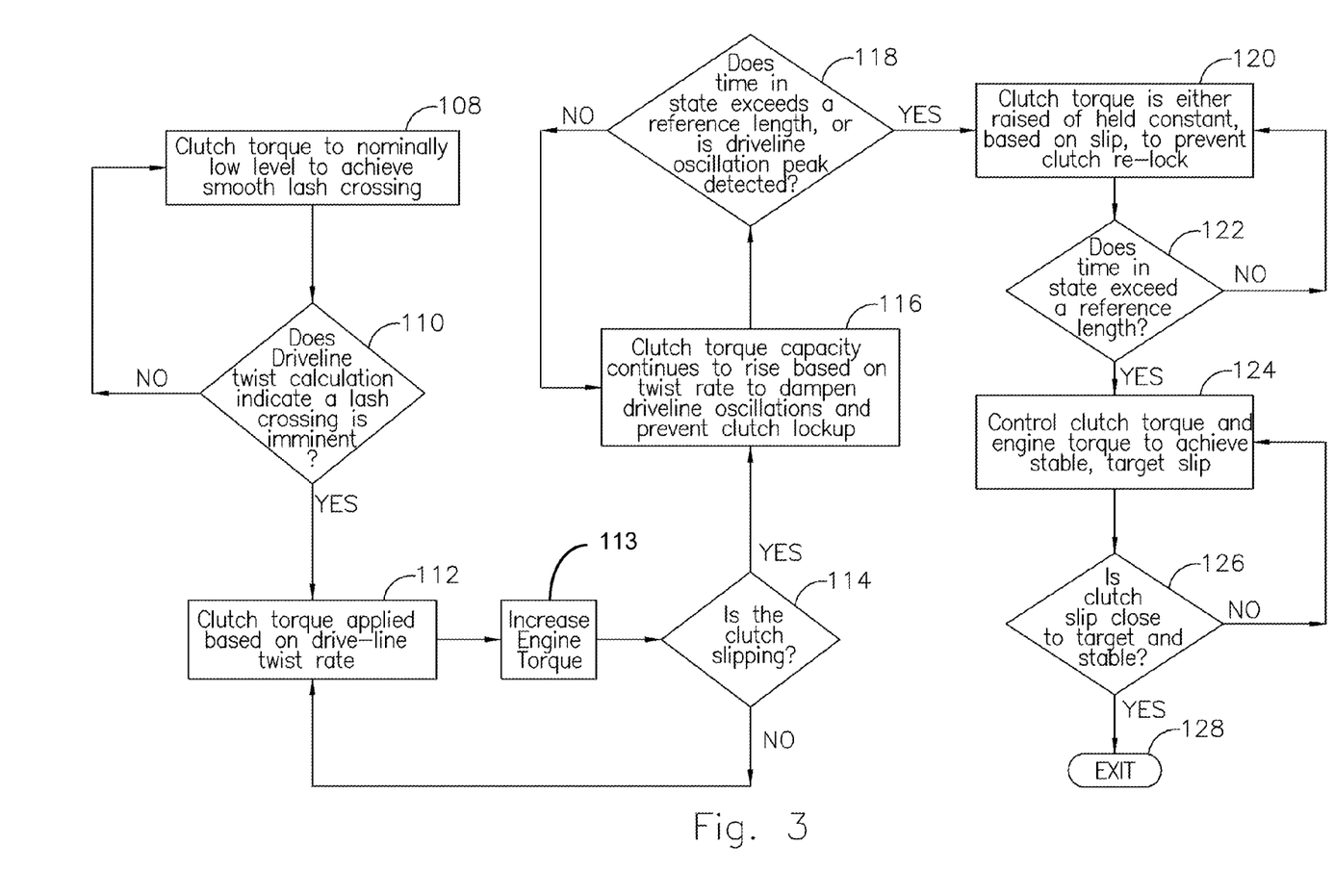
FIG. 3 is logic flow diagram showing the steps of a method for estimating twist in the driveline of FIG. 1.

A controller 72, which includes a microprocessor accessible to electronic memory containing the algorithms of FIGS. 2 and 3, receives from an engine controller an input signal 67 representing torque produced by engine 62, and receives from a transmission controller an input signal 69 representing torque produced by the transmission input clutch 12, 20 corresponding to the current transmission gear. Controller 72 produces an output electronic signal 73 representing commanded engine torque, and an output signal 74 representing the commanded torque capacity of clutches 12, 20. Controller 72 also receives input signals 75, 76 representing the speed at the outboard and inboard ends, respectively, of halfshafts 70, 71; signal 77 representing the speed of transmission input 14; signal 78 representing the speed of layshaft 18; and signal 79 representing the speed of layshaft 24. The position of the vehicle's accelerator pedal 130 is represented by an input signal 63 communicated to controller 72.

Controller 72 repetitively samples the input signals at each execution of the algorithms and uses speed signals 77, 78, 79 to determine the magnitude of variable slip across clutches 12, 20 and speed signals 75, 76 to determine the twist angle of the halfshafts 70, 71, hereinafter referred to as halfshaft or driveline twist.

There are five primary conditions in which driveline twist is estimated: (1) open clutch, (2) clutch applied with negative slip, (3) clutch applied with positive slip, (4) near zero clutch slip with calculated engine torque less than the negative of clutch torque and, (5) near zero clutch slip with engine torque greater than the negative of clutch torque.

FIG. 2 illustrates the steps of the control for initializing, integrating and estimating driveline twist after detecting, at step 80, a transition from a power-off condition to a power-on condition. At step 82 the status of the currently operative input clutch 12, 20 is checked.

At step 84 a test is made to determine whether the clutch is open. When the clutch 12, 20 is commanded open, at step 86 driveline twist is initialized as a negative value equivalent to the driveline twist required to travel through lash. This twist to travel through lash is measured in the gear box 10 and is set as a calibrated value. In this case, driveline twist is the degrees of twist required to traverse lash if the output 54 is held and the input 14 is turned from one side of lash to the opposite side.

At step 88 a test is made to determine whether the clutch 12, 20 is applied with negative slip. If clutch slip is sufficiently negative and the estimated clutch torque capacity is above zero, at step 90 a negative overall driveline twist, which is the algebraic sum of lash crossing twist and halfshaft twist, is estimated using the equation:

$$\text{Twist} = -(\text{Lash crossing twist}) - (\text{Estimated clutch torque} * \text{Gear ratio} * K)$$

wherein lash crossing twist is the angular twist to travel through lash as described above; gear ratio is the ratio of the currently engaged transmission gear; and K is the torsional spring constant of the subject halfshaft.

Similarly, at step 92 a test is made to determine whether the clutch 12, 20 is applied with positive slip. If clutch slip is sufficiently positive and the clutch torque capacity is above zero, at step 94 a positive overall driveline twist is estimated using the equation:

$$\text{Twist} = \text{Lash crossing twist} + (\text{Estimated clutch torque} * \text{Gear ratio} * K)$$

At step 96 a test is made to determine whether the torque capacity of the clutch is greater than engine torque. When clutch slip is below a minimum reference slip or near zero, and engine torque is less than the negative of the clutch torque capacity, the driveline is assumed to have a negative twist that is dependent on the clutch torque capacity. This approach assumes the estimation of the clutch torque capacity is more accurate than the engine torque estimation in the presence of negative engine torque. In this case at step100, the overall driveline twist is calculated the same as in the step 90 equation:

$$\text{Twist} = -(\text{Lash crossing twist}) - (\text{Estimated clutch torque} * \text{Gear ratio} * K)$$

When clutch slip is near zero, and the engine torque is greater than the negative of the clutch torque capacity, the torque contributing to the driveline twist is determined to be the lesser of 0.0 Nm and the current engine torque. This assumes that, in this condition, the driveline twist must be no greater than the negative of the lash crossing twist. This assumption is based on the twist initialization assessment being done in a power-off coasting condition, such that the the driveline will be pushed to the negative side of lash. In this case at step 98, the overall driveline twist is estimated using the equation:

$$\text{Twist} = -(\text{Lash crossing twist}) - (\text{lesser of engine torque and } 0.0 \text{ Nm} * \text{Gear ratio} * K)$$

The estimation of driveline twist sets the foundation for coordination of clutch and engine torque control systems.

By monitoring overall driveline twist it is possible to predict when the lash crossing will occur in advance of the actual event. After twist is initialized, as described above, twist is continually updated using the difference in the rotational speeds at each end of the halfshafts 70, 71. The speed sensors for measuring transmission speed may be located at the inboard end of the halfshafts, and the wheel speed sensors are located on the outboard end of the halfshafts. Alternatively, transmission speed may be measured at the output 54 or input 14. The rate of change of the driveline twist is directly calculated at step 102 using the difference between transmission speed and wheel speed. The rate of change of the driveline twist, multiplied by the interval between samples, i.e., the sample time, allows for adjustments to the driveline twist at step 104.

At step 106, the current driveline twist and the twist rate of change are used by the control algorithm of FIG. 3 to predict when the driveline will reach the positive side of lash. Prediction of the lash crossing provides a means of accounting for the phase lag between commanded clutch torque and clutch torque response. The typical response lag time is 0.030 to 0.040 seconds; therefore, it is important to begin increasing the clutch torque in advance of reaching the positive side of lash to provide a known locked clutch condition and improved tip-in response.

The control method manages engine torque during tip-in events to control the energy input into the driveline by limiting the speed of the driveline twist prior to and during the lash crossing and then raising engine torque to produce produce slip at the proper time relative to the frequency of the driveline.

The engine control algorithm uses estimated driveline twist from step 106 to lower engine torque prior to the gearbox lash crossing and holding engine torque low through the end of lash to achieve a targeted twist rate.

Figure 4:
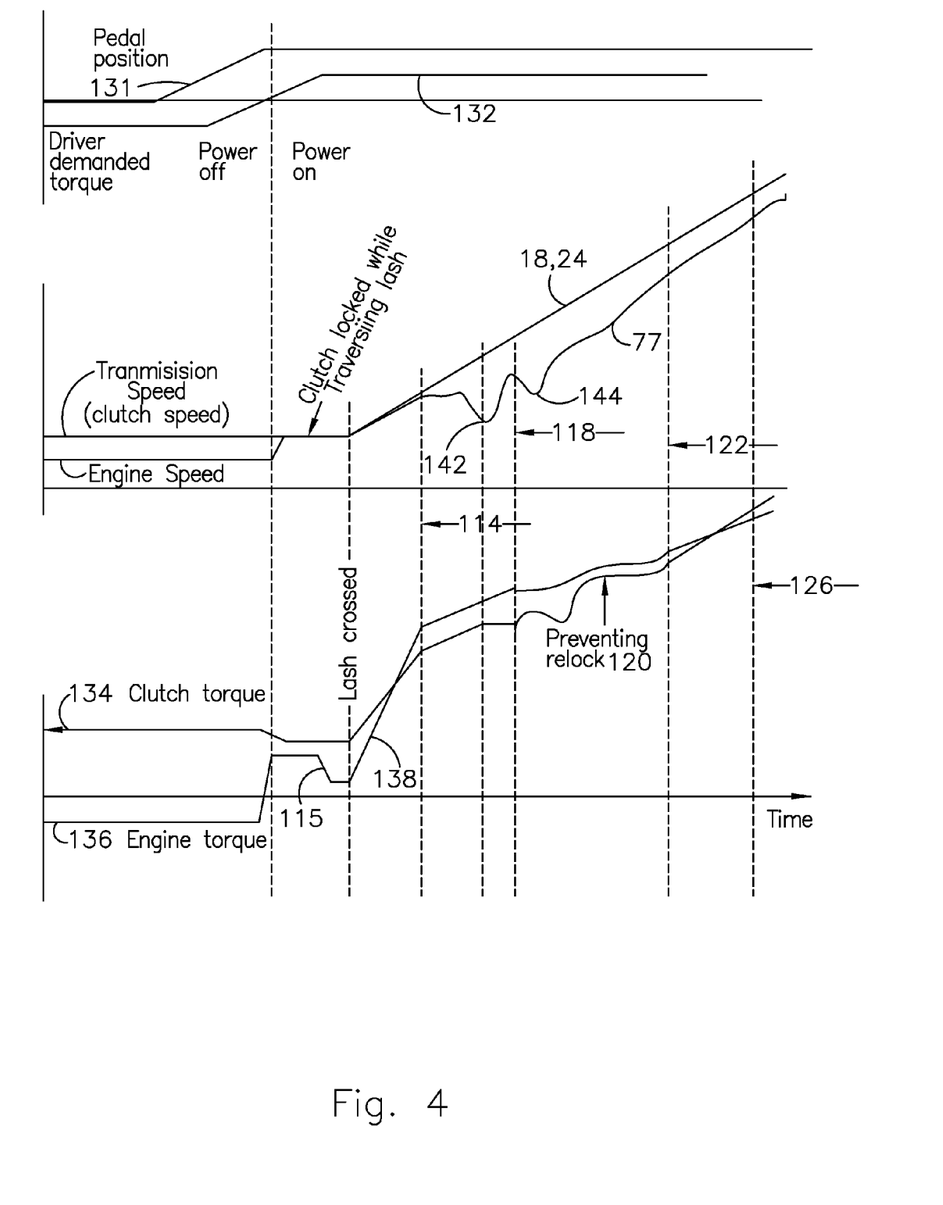
FIG. 4 is a graph of signals that control the driveline during a lash crossing.

FIGS. 3 and 4 show a tip-in occurring when the position 131 of accelerator pedal 130 is depressed, thereby producing a demanded wheel torque 132.

At step 108 the torque transmitting capacity of the transmission input clutch 12, 20 that corresponds to the current transmission gear is set by signal 74 to a low magnitude in order to achieve a smooth lash crossing while locking the clutch. The torque transmitting capacity of the clutch 12, 20 is sometimes called clutch torque capacity, clutch capacity or clutch torque.

While the torque capacity 134 of the subject clutch 12, 20 is at this low magnitude, engine torque 136 is held low by signal 73 so that the drivetrain smoothly moves through lash with a targeted twist rate.

As FIGS. 3 and 4 illustrate, when the driver has demanded an increase in torque 132, the engine torque is increased to raise speed. Then, if the twist calculation indicates that a lash crossing is eminent, engine torque is reduced briefly at 115 so that when the engine shifts from the negative engine mount to the positive engine mount no bump perceptible to the vehicle occupants occurs. This reduction in engine torque does not decrease engine speed; it minimizes the force of the impact that occurs when the engine shifts to the positive mount.

Preferably, reducing engine torque is accomplished by at least one of the following techniques in response to signal 73: retarding engine spark, cutting out an engine fuel injector, reducing a pulse width of an engine fuel injector, changing lift of an engine intake valve, and changing duration of lift of an engine intake valve.

At step 110, controller 72 performs a test to determine whether the estimated driveline twist indicates that a lash crossing is imminent. If a lash crossing is not imminent, control returns to step 108.

When an imminent lash crossing has been identified, at step 112 clutch torque capacity 134 is increased by signal 74 to ensure that the subject clutch 12, 20 remains locked at the completion of the lash crossing.

At step 113, engine torque 136 is smoothly increased by signal 73, preferably along a linear ramp 138.

At step 114, controller 72 performs a test to determine from speed signals 77, 78 whether the subject clutch is slipping. If the result of test 114 is negative, control returns to step 112.

If the result of test 114 is positive, at step 116 signal 74 continues to increase clutch torque capacity 134 based on the twist rate, thereby dampening driveline torque oscillations yet preventing the clutch from becoming locked, i.e., fully engaged. Positive clutch slip is produced by allowing the reaction to driveline torque to exceed the torque capacity of the clutch. The halfshafts 70, 71 provide the reaction to driveline torque.

By allowing clutch torque capacity 134 to increase at a slightly lower rate than the rate of change of reaction torque, it is possible to consistently initiate clutch slip within the first oscillatory period of a locked clutch driveline. Once the reaction torque exceeds the clutch torque capacity, slip occurs and the torsional natural frequency of the driveline changes to the slipping clutch frequency of approximately 6 Hz. By continually increasing clutch torque capacity 134 immediately following occurrences of clutch slip at 142, 144, impending driveline oscillations are dampened. The increase in clutch torque capacity acts as a viscous drag on the driveline, dampening the system. Because the rate of increase in clutch torque capacity 134 is determined by the twist rate or driveline reaction torque rate, the rate of increase of clutch torque capacity remains proportional to the torsional energy input to the driveline.

Controller 72 uses the control algorithm to determine clutch torque capacity from Clutch Torque=(Torque last loop)+(loop time*driveline reaction torque rate)

wherein loop time is the length of a period between successive executions of the algorithm.

Controller 72 determines driveline reaction torque rate from

Driveline reaction torque rate=(Driveline twist rate)*($K$ factor)/(Gear ratio)$^2$ wherein gear ratio is the gear ratio produced by the current operating gear produced by transmission 10.

Clutch torque capacity 134 continues to increase for a period of time determined by the frequency of the driveline until the bottom of the first 6 Hz oscillation.

At step 118, controller 72 performs a test to determine whether clutch torque capacity has remained constant for longer than a reference length, or a peak in transmission clutch speed oscillation has occurred. If the result of test 118 is negative, control returns to step 116.

If the result of test 118 is positive indicating that the driveline damping phase is completed, at step 120 engine torque 136 and clutch torque capacity 134 are controlled by signals 73, 74, respectively, to prevent the subject input clutch from relocking and to prevent high slip rattle, commonly referred to as grattle.

Clutch torque capacity is controlled as a function of clutch slip. If slip is low, indicating that the possibility of a clutch relock is imminent, clutch torque is held constant signal 74 allowing engine torque to increase and clutch slip to increase. If slip is high, clutch torque capacity continues to increase as a function of slip to prevent flare and to improve tip-in response.

At step 122, controller 72 performs a test to determine whether the time allowed for preventing the relock has expired. If the result of test 122 is true, at step 124 engine torque is controlled in a similar manner by coordinating the timing of the increase in engine torque to a margin above clutch torque capacity to achieve a stable target slip across the subject clutch. Once the first oscillatory period is completed, engine torque is ramped, preferably at a linear rate, by signal 73 towards the driver demanded torque 132. If slip across the clutch is accelerating at an excessive rate, engine torque is reduced to prevent a speed flare.

At step 126, controller 72 performs a test to determine whether clutch slip has become close to the target slip and remains stable. If the result of test 126 is true, the control algorithm is exited at step 128.

Determining Bounds on Driveline Twist Estimate

To prevent the twist estimate from accumulating large errors over time it is important to put both an upper bound and a lower bound on the driveline twist estimate. To determine the bounds the driveline uncertainties are examined.

Figure 5:
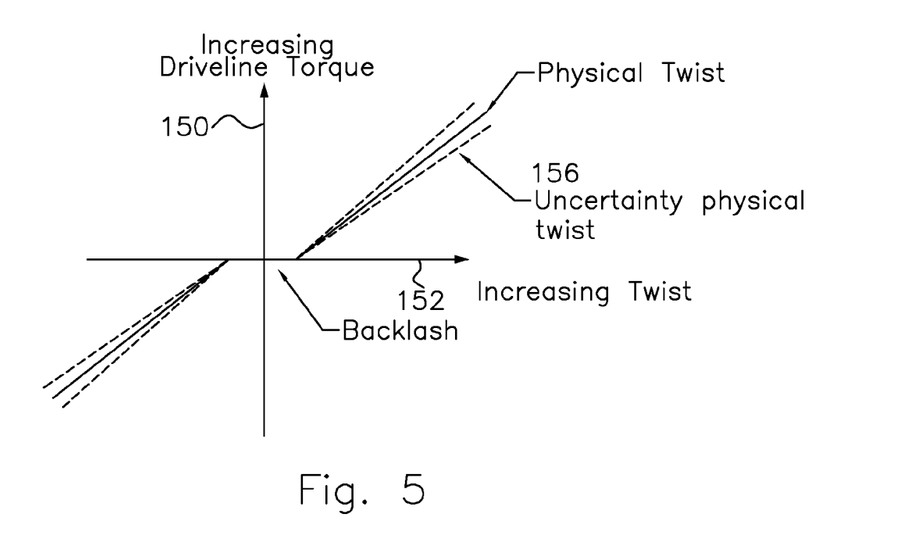
FIG. 5 is a graph showing driveline input torque versus driveline twist.

An uncertainty in the driveline is the relationship between driveline torque 150, produced by the engine 62 and transmitted through transmission 10, driveshaft 66, differential 68 and half-shafts 70, 71 to the wheels 64, 65, and the physical twisting 152 of the driveline. The relationship of these variables is illustrated in FIG. 5, wherein the dashed lines indicate uncertainty in the driveline twist estimate based on uncertainties in the stiffness of the driveline, piece-to-piece manufacturing variability and changes in stiffness over time.

At zero driveline torque there is zero twist in the driveline and no uncertainty in the physical twist of the driveline. As the driveline torque increases, the uncertainty in driveline twist 156 increases linearly. This uncertainty can be due to (i) piece-to-piece variability in torsional stiffness of driveshaft 66 or in torsional stiffness of half-shafts 70, 71 and (ii) changes over time in the torsional stiffness of the shafts due to use. The uncertainty in lash 156 also varies both in piece-to-piece manufacturing and increases over time, which can be determined during normal vehicle operation.

Figure 6:
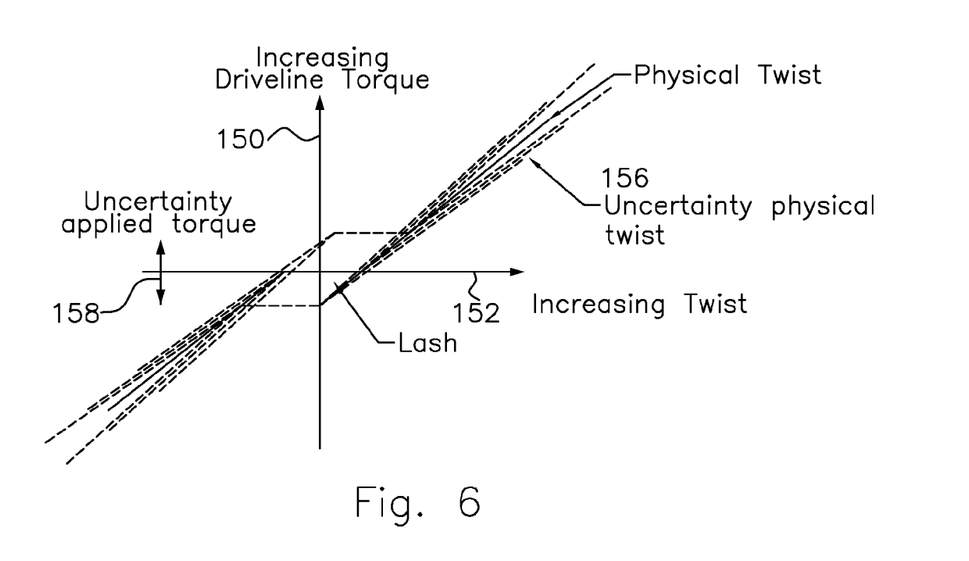
FIG. 6 is a graph that adds to FIG. 1 uncertainty as to driveline input torque.

A second uncertainty is the input torque estimate 158. This uncertainty is due to errors in the engine torque estimate on a conventional vehicle and on a hybrid electric vehicle, which can include torque estimate errors on the electric mach. FIG. 6 includes both the uncertainties of the shaft torsional stiffness of the shafts and the input torque estimate. It can be seen in FIG. 6 that the largest uncertainty occurs near zero input torque.

Figure 7:
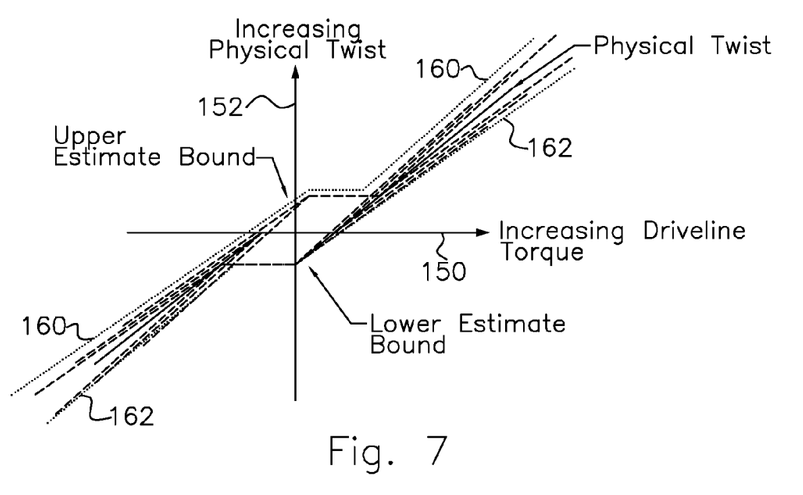
FIG. 7 is a graph that shows an upper bound and a lower bound to the driveline twist estimate based on uncertainty as to applied driveline torque and shaft torsional stiffness.

A third step to determine the bounds on the twist estimate is shown in FIG. 7, wherein an upper bound 160 and a lower bound 162 include the effects of the two main driveline system uncertainties. The degree of uncertainty is largest largest near zero input torque. This third step prevents noise on the input signals from causing larger errors in the twist estimate.

Figure 8:
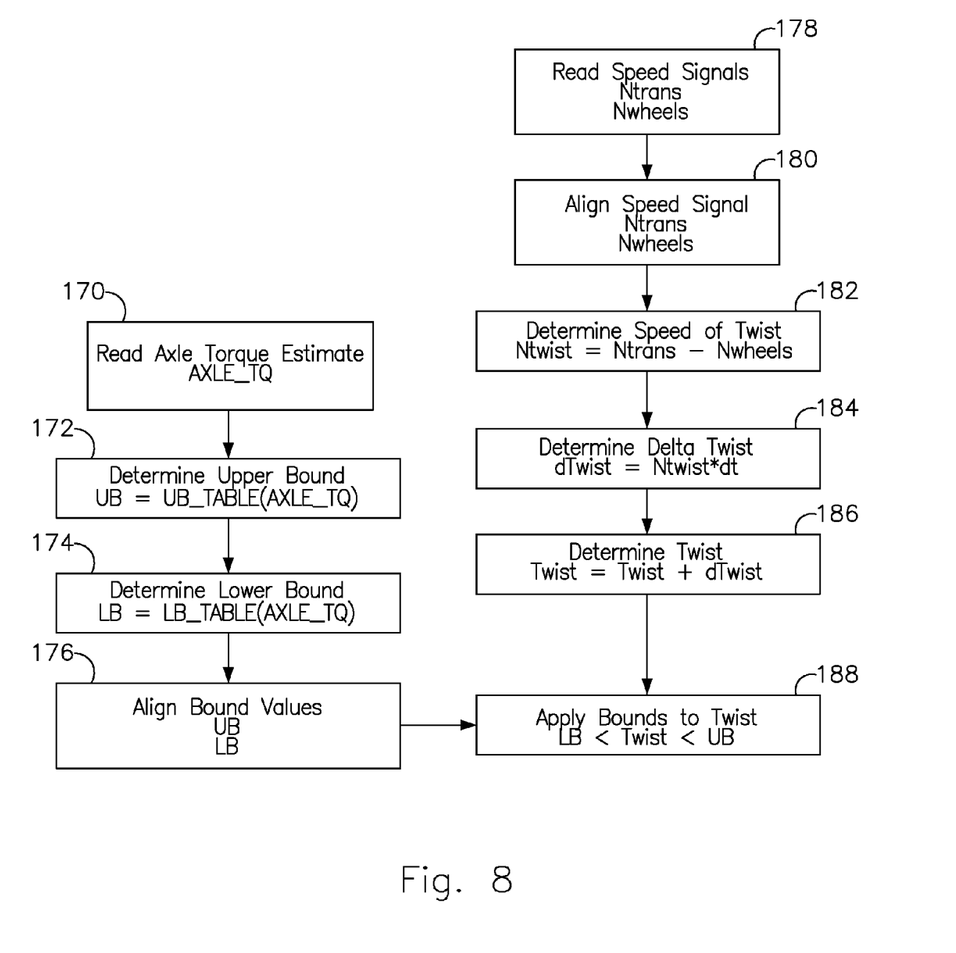
FIG. 8 is a logic diagram showing the steps for establishing torque-based and speed-based driveline twist estimates.

The logic diagram of FIG. 8 shows steps of an algorithm for establishing torque-based and speed-based driveline twist estimates. At step 170 a range of estimated torque at the transmission output 54 is established for determined applied to the driveline of vehicles equipped with substantially identical driveline components.

At step 172 the upper bound of driveline twist that occurs due the driveline torque is determine empirically for the population of drivelines over the range of driveline torque that is applied.

At step 174 the lower bound of driveline twist that occurs due to the driveline torque is determine empirically for the population of drivelines over the range of driveline torque that is applied.

Preferably at step 176 the results of steps 172 and 174 are stored electronically in look-up tables accessible to controller 72, so that the upper bound of driveline twist and the lower bound of driveline twist can be determined from the tables upon being indexed by the torque applied to the driveline.

At step 178 speed signals 75, 76 representing the speed at the outboard end and inboard end of half-shafts 70, 71 are read.

At step 180 speed signals 75, 76 are synchronized such that they are read at substantially the same instant thereby eliminating delays and phase discrepancies.

At step 182 the speed of driveline twist that occurs between the inboard and outboard ends of half-shafts 70, 71 is determined from the difference between the speeds at inboard and outboard ends of half-shafts 70, 71.

The incremental change in driveline twist is determined at step 184 over the duration of an interval between sampling by multiplying the speed of driveline twist at step 182 by the duration of the sampling interval, which may be about 35 ms.

At step 186 current driveline twist is determined as the sum of each incremental change in driveline twist that occurs over each sampling interval.

At step 188 driveline twist, as determined at step 186 for speed-based estimated driveline twist, is corrected by discounting driveline twist values that are greater than the upper bound UB and lower than the lower bound LB, as determined at step 176 for torque-based estimated driveline twist, over the range of torque applied to the driveline.

In this way estimated driveline twist, determined on the speed-based technique of steps 178 through step 186, will be not be greater than the UB and not less than the LB determined during torque-based driveline twist estimate testing.

The method for estimating driveline twist is divided into three zones based on driveline input torque. The first zone 190 is for negative input torque, the second zone 192 is for near zero input torque and the third zone 194 is for positive input torque (shown in FIG. 9). Additionally the estimated driveline twist is bounded based on the input torque. Using this technique, a bounded continuous estimate of the driveline twist is available and can be used to coordinate driveline input torque to produce both quick lash crossings and minimal driveline NVH.

Determining when to Use the Speed-Based Estimate

The estimate of driveline lash as determined by steps 178 through 188 has very low signal-to-noise ratio when the inboard and outboard speeds are nearly the identical. This can cause the estimate to accumulate large errors over time. However, when those speeds are different, during unwinding of the subject shaft and crossing of lash, the signal-to-noise ratio is much higher. The driveline twist determined with reference to speed differences is best used only when there is a good signal-to-noise ratio. The driveline twist estimate methods are chosen based on the input torque estimate.

Figure 9:
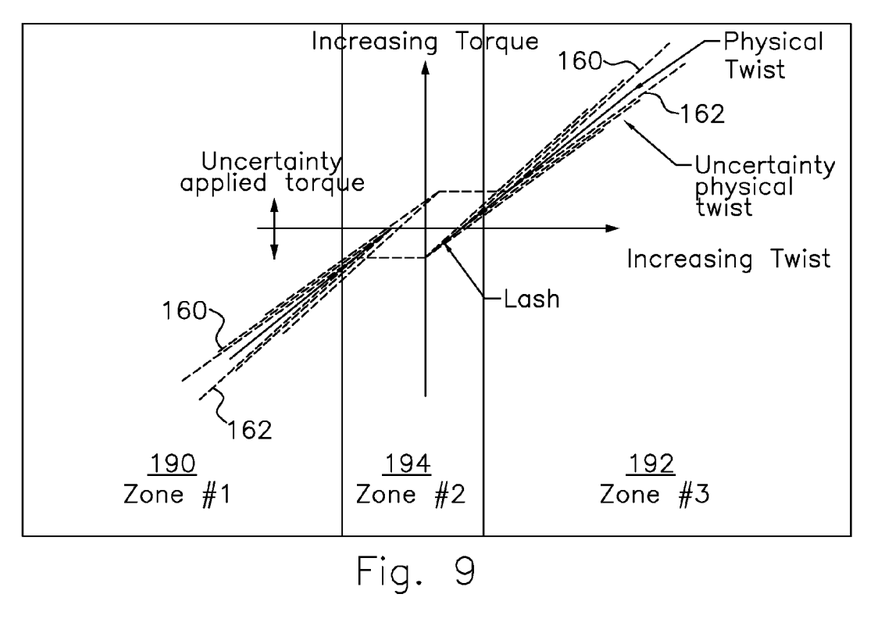
FIG. 9 is a graph that shows three zones wherein first and second driveline twist estimates are produced.

As shown in FIG. 9, a preferred method for controlling driveline torque during a lash-crossing event would apply the driveline twist estimate method to three zones. In the first zone 190, current driveline input torque is negative and not negative and not near zero. In zone 190 the lash has been crossed and the driveline has begun to undergo physical twist. In zone 190, the driveline twist estimate is a function of the driveline input torque estimate only and does not use the speed difference method.

In the third zone 192, wherein the twist estimate is based on the input torque estimate, input torque is positive and not near zero.

In the second zone 194, the signal-to-noise ratio on the speed difference is higher than in zones 190, 192 and can be used for the twist estimate. The driveline twist estimate in zone 194 is determined with reference to the speed difference at opposite ends of the subject driveline shaft, or as determined from the speed of the transmission output 54 and the speed of wheels 64, 65. While operating in zone 194, the twist estimate is bounded by the upper and lower bounds 160, 162.

Vehicle Implementation

Figure 10:
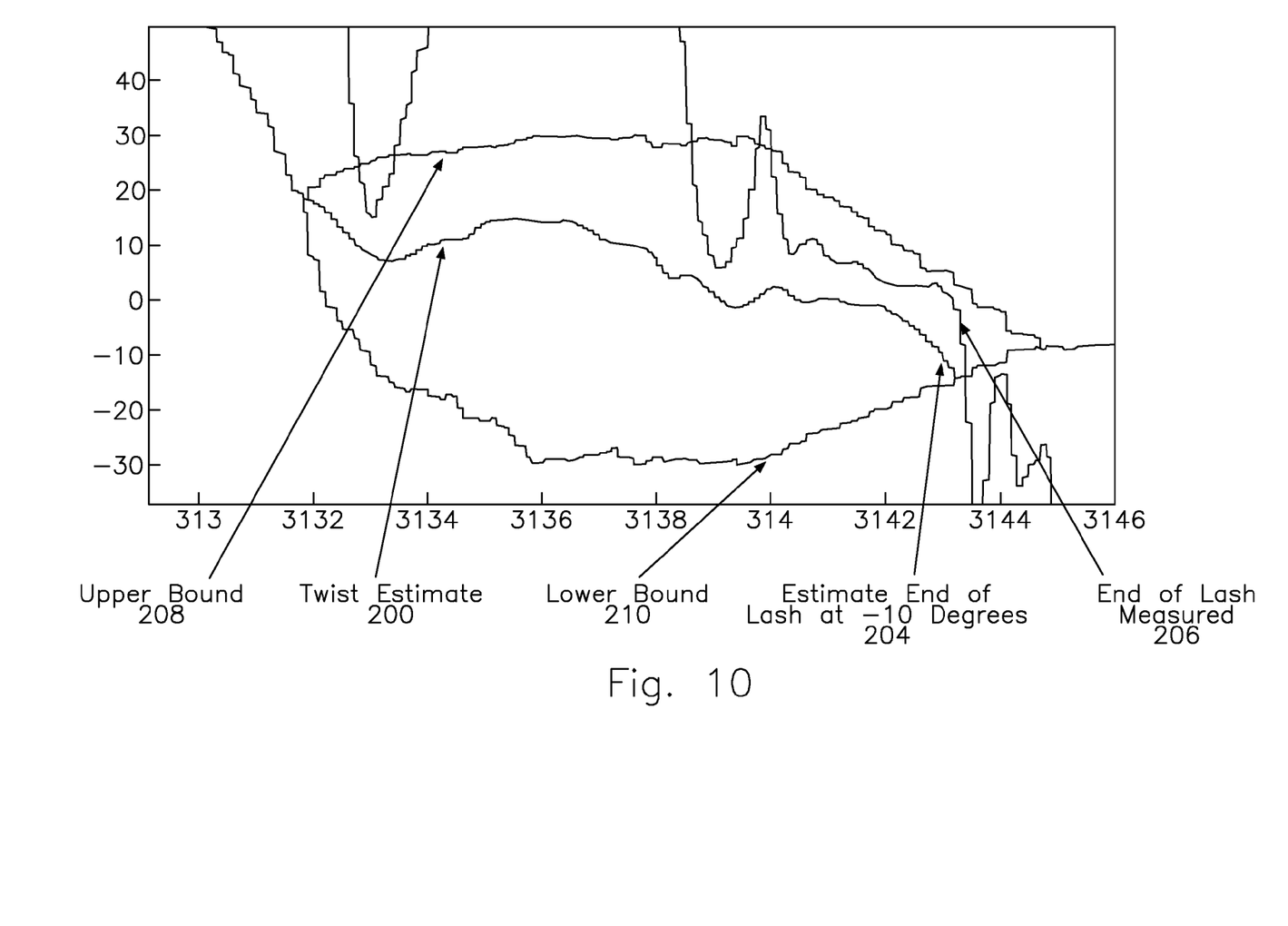
FIG. 10 is a graph that shows the variation of driveline parameters during a lash closing event.

FIG. 10 shows the bounded driveline twist estimate being calculated on a vehicle that is equipped with torque meters on half-shafts 70, 71. During a tip-out event the axle torque carried by the half-shafts 70, 71 goes from a high magnitude down to zero and then to a negative magnitude. During a tip-out event the driveline passes through lash.

In the graph of FIG. 10 the range of estimated lash 200 is from −10 degrees to +10 degrees. It can be seen that even during this very slow crossing of lash that the twist estimate 200 can give a very good indication of when lash is entered 202 and when lash is complete 204. The measured end of the lash crossing is at 206. The upper bound is 208; the lower bound is 210.

By using this estimate of driveline twist the engine torque can be controlled to give both a faster and a smoother transition of driveline lash. In a vehicle with a CISG this transition through lash is needed before the vehicle can perform regenerative braking and more regenerative braking leads to better fuel economy. When transitioning from regenerative braking to positive power, a faster faster lash crossing leads to less vehicle hesitation.

In accordance with the provisions of the patent statutes, the preferred embodiment has been described. However, it should be noted that the alternate embodiments can be practiced otherwise than as specifically illustrated and described.

The invention claimed is:

1. A method for controlling a subject vehicle driveline, comprising:
   (a) empirically determining upper and lower magnitudes of first estimated driveline twist due a range of applied torque;
   (b) a controller using a difference between two spaced locations in the subject vehicle driveline to determine driveline twist speed due to applied torque;
   (c) the controller using a product of driveline twist speed and a sampling interval to produce a second estimated driveline twist as a sum of incremental changes in driveline twist that are between said upper and lower magnitudes;
   (d) using the first estimated driveline twist to control, via the controller, driveline torque in the subject vehicle, provided driveline torque is negative and has a magnitude indicating that a lash event is remote;
   (e) using the second estimated driveline twist to control, via the controller, driveline torque in the subject vehicle, provided driveline torque has a magnitude indicating that a lash event is imminent; and
   (f) using the first estimated driveline twist to control, via the controller, driveline torque in the subject vehicle, provided driveline torque is positive and has a magnitude indicating that a lash event is remote.

2. The method of claim 1, wherein empirically determining upper and lower magnitudes of first estimated driveline twist due a range of applied torque further comprises:
   applying a range of torque to vehicles equipped with drivelines having substantially identical components as those of the subject powertrain;
   determining an upper bound of driveline twist that occurs due the driveline torque for multiple drivelines over a range of torque applied to the drivelines; and
   determining a lower bound of driveline twist that occurs due the driveline torque for said drivelines over a range of torque applied to the drivelines.

3. The method of claim 2, further comprising:
   storing said upper and lower bounds electronically in a look-up table accessible to the controller that is used to control driveline torque of the subject vehicle driveline.

4. The method of claim 1, wherein step (b) further comprises:
   using a difference between transmission output speed and wheel speed in the subject vehicle driveline to determine driveline twist speed due to applied torque.

5. The method of claim 4, wherein step (b) further comprises:
   repetitively reading speed signals at sampling intervals, each speed signal representing a speed at one of the spaced locations on the subject driveline; and determining a speed of twist of the subject driveline from a difference between the speeds of said spaced locations.

6. The method of claim 5, wherein step (c) further comprises:
   determining repetitively an incremental change in driveline twist by multiplying a current speed of driveline twist of the subject driveline by a length of a corresponding sampling interval;
   developing the second estimated driveline twist by maintaining a sum of incremental changes in driveline twist that occur while a torque is applied to the subject driveline; and
   not incrementing the sum with incremental changes in driveline twist that is greater than said upper magnitude and lower than said lower magnitude.

7. A method for controlling a vehicle driveline having a power source and a transmission clutch, comprising:
   (a) a controller using a difference between two spaced locations in the vehicle driveline to determine driveline twist speed due to applied torque;
   (b) the controller using a product of driveline twist speed and a sampling interval to produce an estimated driveline twist from a sum of incremental changes in driveline twist that are between a upper magnitude and a lower magnitude;
   (c) the controller producing, in response to a demanded wheel torque, a first signal that controls torque transmitted from the power source to the clutch during a lash crossing using the estimated driveline twist and a current driveline torque; and
   (d) the controller producing a second signal that controls clutch torque capacity such that clutch slip is produced during the lash crossing.

8. The method of claim 7 further comprising:
   producing signals representing rotational speed at longitudinally spaced position on a halfshaft to determine a driveline reaction torque rate; and
   increasing clutch torque capacity at a lower rate than the driveline reaction torque rate.

9. The method of claim 7 further comprising:
   producing signals representing differential rotational speed across the clutch to determine a magnitude of the clutch slip.

10. The method of claim 7, wherein a method for determining the upper and lower magnitudes comprises:
    empirically applying a range of torque to vehicles equipped with a driveline having substantially identical components as those of the vehicle driveline;
    determining the upper magnitude from an upper bound of driveline twist that occurs due driveline torque for said vehicles over a range of torque applied to the driveline of each vehicle; and
    determining the lower magnitude from a lower bound of driveline twist that occurs due the driveline torque for said vehicle over a range of torque applied to the driveline of each vehicle.

11. The method of claim 10, further comprising:
    storing said upper and lower bounds electronically in a look-up table accessible to the controller that is used to control torque transmitted from the power source to the clutch of said vehicle driveline.

12. The method of claim 7, wherein step (a) further comprises:
    using a difference between transmission output speed and wheel speed in said vehicle driveline to determine driveline twist speed due to applied torque.

13. The method of claim 12, wherein step (b) further comprises:
    repetitively reading speed signals at sampling intervals, each speed signal representing a speed at one of the spaced locations on said vehicle driveline; and
    determining a speed of twist of the vehicle driveline from a difference between the speeds of said spaced locations.

14. The method of claim 13, wherein step (b) further comprises:
    determining repetitively an incremental change in driveline twist by multiplying a current speed of driveline twist of said vehicle driveline by a length of a corresponding sampling interval;
    developing the estimated driveline twist by maintaining a sum of incremental changes in driveline twist that occur while a torque is applied to said vehicle driveline; and
    not incrementing the sum with incremental changes in driveline twist that are greater than said upper magnitude and lower than said lower magnitude.

* * * * *